(12) United States Patent
Terrill et al.

(10) Patent No.: US 11,201,982 B1
(45) Date of Patent: Dec. 14, 2021

(54) SELECTION OF A PREFERRED IMAGE FROM MULTIPLE CAPTURED IMAGES

(71) Applicant: Amazon Technologies, Inc., Seattle, WA (US)

(72) Inventors: John James Terrill, Seattle, WA (US); Vivek Shah, Seattle, WA (US); Christopher Fredrick Vitas, Seattle, WA (US); Samir Raj Hegde, Seattle, WA (US); Kadirvelu Rathnavelu, Seattle, WA (US); Jason Garrett Volpe, Seattle, WA (US); Jonathan Edward Suchland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/957,834

(22) Filed: Apr. 19, 2018

Related U.S. Application Data

(63) Continuation of application No. 15/492,388, filed on Apr. 20, 2017, now Pat. No. 9,955,033, which is a continuation of application No. 15/137,769, filed on Apr. 25, 2016, now Pat. No. 9,635,213, which is a continuation of application No. 14/480,308, filed on Sep. 8, 2014, now Pat. No. 9,325,876.

(51) Int. Cl.
| | |
|---|---|
| *H04N 5/235* | (2006.01) |
| *H04N 5/232* | (2006.01) |
| *H04N 1/21* | (2006.01) |
| *H04N 5/77* | (2006.01) |
| *H04N 5/91* | (2006.01) |

(52) U.S. Cl.
CPC .......... *H04N 1/2129* (2013.01); *H04N 1/215* (2013.01); *H04N 1/2145* (2013.01); *H04N 5/2351* (2013.01); *H04N 5/2354* (2013.01); *H04N 5/23229* (2013.01); *H04N 5/23293* (2013.01); *H04N 5/77* (2013.01); *H04N 5/91* (2013.01)

(58) Field of Classification Search
CPC ............. H04N 1/2129; H04N 5/23293; H04N 5/23229; H04N 5/2351; H04N 1/215; H04N 5/2354; H04N 5/77; H04N 1/2145; H04N 5/91
See application file for complete search history.

(56) References Cited

U.S. PATENT DOCUMENTS

| | | | |
|---|---|---|---|
| 8,077,222 B2 | 12/2011 | Niida | |
| 8,289,400 B2 * | 10/2012 | Brunner | H04N 5/144 348/208.1 |
| 8,644,685 B2 * | 2/2014 | Kamotani | H04N 1/00442 386/278 |
| 9,325,876 B1 * | 4/2016 | Terrill | H04N 1/2129 |

(Continued)

*Primary Examiner* — Hung H Lam
(74) *Attorney, Agent, or Firm* — Eversheds-Sutherland (US) LLP

(57) ABSTRACT

Systems, methods, and computer-readable media are disclosed for selection of a preferred image from multiple captured images. An image corresponding to a photograph time t=0 may be retrieved from a circular buffer and stored as a preferred image. Alternative images captures before and after the t=0 image may be retrieves and stored in an alternative image location. The t=0 image and preferred images may be presented to a user in a user interface. The user may select a preferred image for the photograph from among the t=0 image and the alternative images.

20 Claims, 11 Drawing Sheets

(56) References Cited

U.S. PATENT DOCUMENTS

| | | |
|---|---|---|
| 9,363,431 B2 | 6/2016 | Rav-Acha |
| 9,635,213 B1 | 4/2017 | Terrill et al. |
| 9,955,033 B1 | 4/2018 | Terrill et al. |
| 2002/0051074 A1 | 5/2002 | Kawaoka et al. |
| 2002/0180870 A1 | 12/2002 | Chen |
| 2003/0146981 A1* | 8/2003 | Bean .................. H04N 5/232 348/222.1 |
| 2008/0079817 A1 | 4/2008 | Murata et al. |
| 2008/0136940 A1* | 6/2008 | Srikanth ............ H04N 1/215 348/231.99 |
| 2008/0198243 A1* | 8/2008 | Kijima ............... H04N 1/2112 348/231.99 |
| 2008/0284875 A1* | 11/2008 | Mizutani ............ H04N 5/772 348/231.6 |
| 2008/0316332 A1* | 12/2008 | Knutson-Ek ....... H04N 5/23293 348/224.1 |
| 2009/0262218 A1* | 10/2009 | Makii .................. G03B 15/08 348/239 |
| 2009/0322745 A1 | 12/2009 | Zhang et al. |
| 2010/0309334 A1* | 12/2010 | James ................. H04N 5/144 348/231.2 |
| 2010/0309335 A1* | 12/2010 | Brunner .............. H04N 5/144 348/231.6 |
| 2010/0321530 A1 | 12/2010 | Baek |
| 2012/0081556 A1 | 4/2012 | Hwang et al. |
| 2012/0081560 A1 | 4/2012 | Park et al. |
| 2013/0208165 A1 | 8/2013 | An et al. |
| 2013/0215283 A1 | 8/2013 | Sung et al. |
| 2013/0335596 A1* | 12/2013 | Demandolx ........ H04N 5/2354 348/231.99 |
| 2014/0111670 A1* | 4/2014 | Lord .................. H04N 5/23206 348/240.99 |
| 2014/0160321 A1 | 6/2014 | Kim |
| 2014/0327795 A1* | 11/2014 | Liu ..................... H04N 1/215 348/231.2 |
| 2014/0354850 A1* | 12/2014 | Kosaka ............. H04N 5/23216 348/231.5 |
| 2015/0138322 A1 | 5/2015 | Kawamura |
| 2015/0249775 A1* | 9/2015 | Jacumet ............ H04N 5/147 348/333.11 |
| 2016/0100109 A1 | 4/2016 | Saito |
| 2016/0150196 A1* | 5/2016 | Horvath ........... H04N 5/23293 348/211.4 |

\* cited by examiner

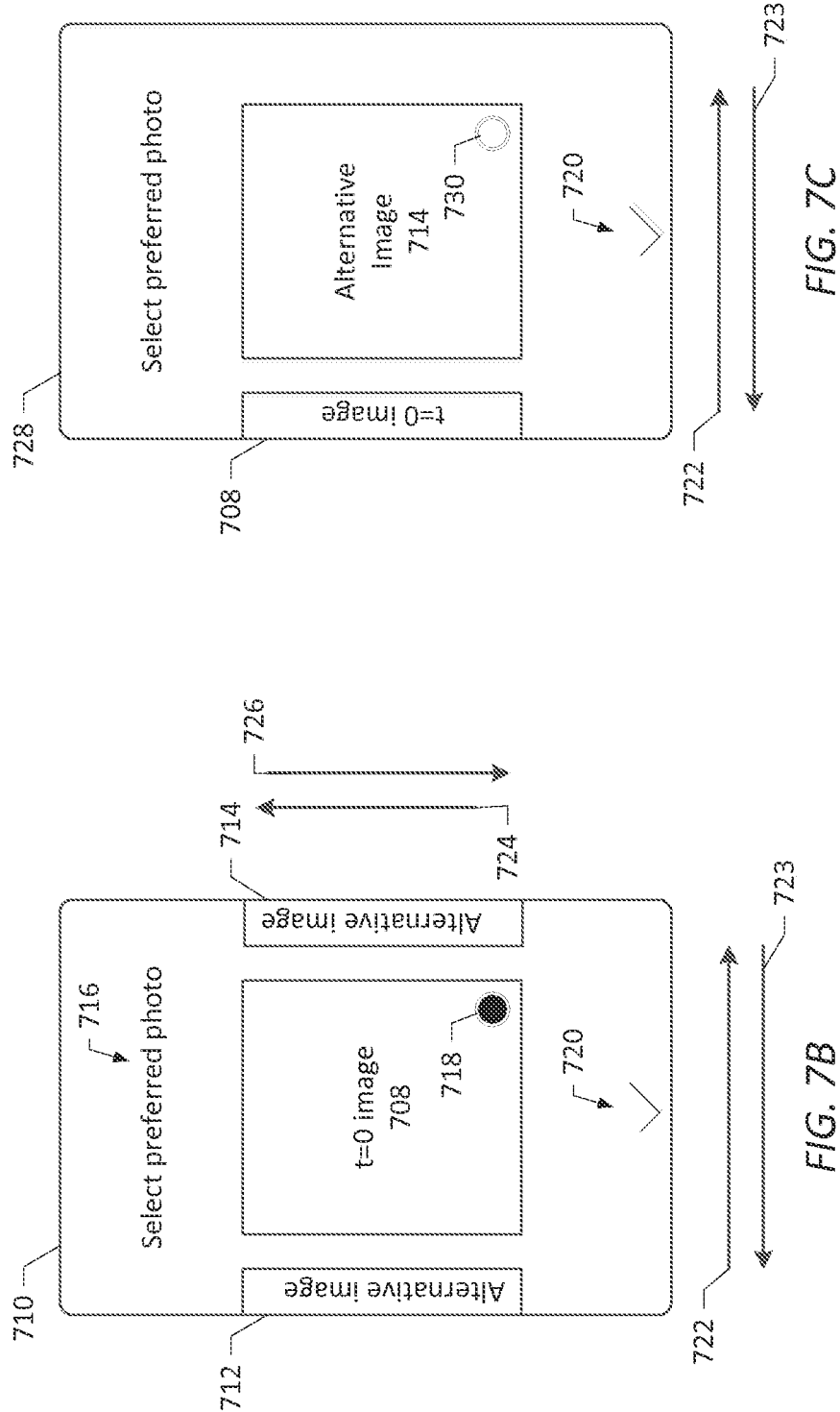

SELECTION OF A PREFERRED IMAGE FROM MULTIPLE CAPTURED IMAGES

CROSS-REFERENCE TO RELATED APPLICATION(S)

This application is a continuation of U.S. application Ser. No. 15/492,388, filed Apr. 20, 2017, which is a continuation of U.S. application Ser. No. 15/137,769, filed Apr. 25, 2016, now U.S. Pat. No. 9,635,213, issued Apr. 25, 2017, which is a continuation of U.S. application Ser. No. 14/480,308, filed Sep. 8, 2014, now U.S. Pat. No. 9,325,876, issued Apr. 26, 2016, the contents of which are incorporated herein by reference in their entireties.

BACKGROUND

Many electronic devices include cameras that enable a user to capture still images and video of their environment. A user's perception of the performance of a camera may be affected by multiple factors, such as the size of an image sensor, the shutter speed, and the lighting conditions. Some cameras may be affected by the lighting conditions of the environment. In some instances, a photograph taken by the camera may be unsatisfactory to a user. Consequently, a user may spend additional time taking multiple photographs in an attempt to obtain the best possible image. Moreover, a user may not have time to take additional photographs and may be unhappy with or discard an unsatisfactory photograph.

BRIEF DESCRIPTION OF THE DRAWINGS

FIGS. 7A-7E are diagrams of screens of a user interface in accordance with an embodiment of the disclosure.

Figure 1:
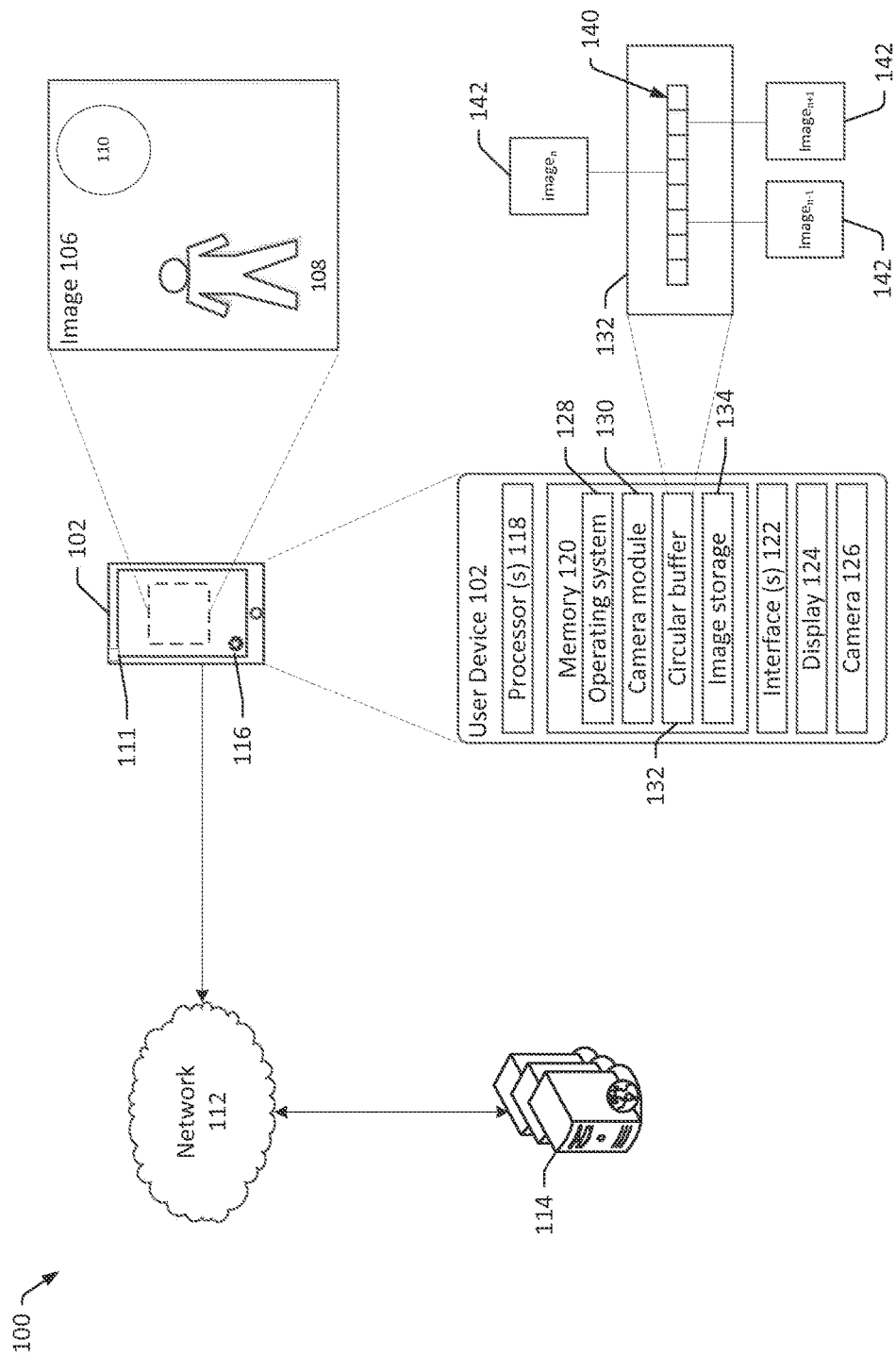
FIG. 1 is a schematic diagram of a system in accordance with an embodiment of the disclosure.

Certain implementations will now be described more fully below with reference to the accompanying drawings in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Embodiments of the disclosure enable a user to select among images captured before, during, and after a user presses a shutter button of a camera to take a photograph. The images are displayed to the user in an image selection user interface on a user device, such as a camera or a smartphone with a camera. A user may view an image captured before the shutter button was pressed (a "pre-shutter" image), an image captured at the time the shutter button was pressed (a "shutter" image), and an image captured after the shutter button was pressed (a "post-shutter" image). After viewing the images, the user may select a preferred image (also referred to as a "best shot" image) for the photograph. The photograph on the user device will be updated to the user-selected image and may be sent to a cloud storage service for synchronization to other user devices.

With the foregoing in mind, described herein are systems, methods, and computer-readable media for selection of a preferred image from multiple captured images. In some embodiments, a user device may capture images via a camera after a camera ready mode is activated. A sequence of captured images may be captured at a frame rate and stored in a circular buffer of a memory of the user device. A user may select a shutter button of the user device to take a photograph. Upon selection of the shutter button at a time t=0, the image captured at time t=0 and two alternative images may be retrieved from the circular buffer. For example, the captured image stored in the circular buffer location that corresponds to time t=0 may be retrieved as a default preferred image for the photograph. The t=0 image may be stored in a preferred image location. Additionally, alternative images before and after the capture of the t=0 image may be retrieved from the circular buffer.

In some embodiments, the alternative images may be selected using a frame interval determined from a frame rate of image capture of the images stored in the circular buffer. For example, a frame rate may be obtained from the camera (e.g., from an image sensor) and a frame interval determined from the frame rate. In some embodiments, the frame interval may be determined to meet a specific time interval between the alternative frames and the t=0 frame. Using on the frame interval, an alternative image captured before the t=0 image may be retrieved from a circular buffer location. Similarly, using the frame interval, an alternative image captured after the t=0 image may be retrieved from a circular buffer location. The alternative images may be stored in an alternative image location of a memory of the user device.

In some embodiments, an alternative image may be selected based on the absence of a flash when the images where captured. In some embodiments, the t=0 image may be captured using with an activated flash of the camera of the user device. In such embodiments, both a duration of time and a frame interval may be used to retrieve images from the circular buffer. In such embodiments, the alternative image before the capture of the t=0 image may be retrieved based on a duration before the t=0 image to obtain an alternative image captured without the use of a flash. The alternative image after the capture of the t=0 image may be retrieved based on a frame interval specifying a number of frames after the capture of the t=0 image. The activation of the flash may be received from the camera at the t=0 time the shutter button is pressed. The alternative images may be retrieved from the circular buffer and stored in an alternative image storage location.

In some embodiments, the t=0 image and alternative images may be provided to a user in a user interface for selection of a preferred image for the photograph taken at t=0. In some embodiments, the t=0 image may be selected as the default preferred image. Using the user interface, a user may view the alternative images and, in some instances, select an alternative image as the preferred image for the photograph. The user-selected alternative image may replace the default t=0 image as the photograph. In some embodiments, the user-selected alternative image may be moved to the preferred image location and the unselected t=0 image may be moved to the alternative image location. In some embodiments, a pointer associated with the photograph may be modified to point to the user-selected image. In some embodiments, the user-selected image may be transmitted to a server (e.g., one of more servers of a cloud storage service).

FIG. 1 illustrates a system 100 that includes a user device 102 of a user in accordance with an embodiment of the disclosure. The user device 102 may be a tablet computer, a smartphone, a wearable computer, a personal digital assistant (PDA), an e-reader, or another user device that includes a camera. In some embodiments, the user device 102 may be a camera having the capabilities described below. The user device 102 may be or include a camera to enable capture of an image 106 that may include, for example, a subject 108. The image 106 may be illuminated by a light source 110 (e.g., one or more light sources, including natural and unnatural light sources). In some embodiments, the light source 110 may include a flash 111 of the user device 102. The user device 102 may exchange information over a network 112 with one or more servers 114. The one or more servers 114 may include web servers, application servers, or other types of servers. In some embodiments, the one or more severs 114 may be or may include one or more networked storage devices. Additionally, the one or more servers 114 may be, for example, servers arranged in any physical and virtual configuration, such as servers in one or more data processing centers, a distributed computing environment, or other configuration. Such configurations may use the network 112 for communication or may communicate over other networks. In some embodiments, the one or more servers 114 may be a part of a cloud storage service, such as an image storage service. In such embodiments, images captured by the user device 102 may be stored on the one or more servers 114 (e.g., images may be synchronized between the user device 102 and the one or more servers 114). For example, images may be transmitted between a user device 102 and a networked storage device. While a single user device 102 is shown, in some embodiments other user devices of a user may be present and may communicate with the one or more servers 114. Such other user devices may also synchronize images with the one or more servers 114.

The image 106 may be viewed on the user device 102, and a user may initiate capture of the image 106 via interaction with the user device 102. For example, in some embodiments a camera user interface may include a user interface element, (e.g., a shutter button 116), that, when selected, initiates a photograph of the image 106. In some embodiments, a hardware button, switch, or other hardware component acting as a shutter button may initiate a photograph of the image 106 when selected by a user.

As also shown in FIG. 1, the user device 102 may also include one or more processors 118, memory 120 (e.g., one or more memories such as volatile memory and non-volatile memory), one or more interfaces 122, a display 124, and a camera 126. It should be noted that FIG. 1 depicts merely one example of a particular implementation of a user device 102 and may illustrate only some of the types of components and functionalities that may be present.

The processors 118 may comprise one or more cores and are configured to access and execute (at least in part) computer-readable instructions stored in the one or more memories 120. The one or more processors 118 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 118 and one or more of the other components of the user device 102. In certain embodiments, the user device 102 may be based on an Intel® architecture or an ARM® architecture and the processor(s) 118 and chipset may be from a family of Intel® processors and chipsets. The one or more processors 118 may also include one or more application-specific integrated circuits (ASICs) or application-specific standard products (ASSPs) for handling specific data processing functions or tasks.

The interfaces 122 may also comprise one or more communication interfaces or network interface devices to provide for the transfer of data between the user device 102 and another device directly such as in a peer-to-peer fashion, via an electrical network (not shown), or both. The communication interfaces may include, but are not limited to: personal area networks ("PANs"), wired local area networks ("LANs"), wireless local area networks ("WLANs"), wireless wide area networks ("WWANs"), and so forth. The communication interfaces may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.1 in), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

The display 124 may display images in varying degrees of resolution, contrast, content, and/or location. The display 124 may be, but is not limited to, a liquid crystal display (LCD), light emitting diode (LED) display, a lenticular display, an e-ink display, or an organic light emitting diode (OLED) display. The display 124 may display a user interface (e.g., a graphical user interface). In accordance with some embodiments, the display 124 may include or be provided in conjunction with touch sensitive elements through which a user may interact with the user interface. Such a touch-sensitive display may be referred to as a "touch screen."

The camera 126 may be used to capture images displayed by the user device 102. The camera 126 may vary in resolution, field of view, and/or shutter speed. The camera 126 may include, but is not limited to, charge coupled device (CCD) camera, a complementary metal oxide semiconductor (CMOS) image sensor camera, an infrared camera, or an optical lens camera.

The memory 120 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 120 may be accessible by the one or more processors 118 and other components of the user device 102. The memory 120 may store a variety of information and may be used for a variety of purposes and may store executable computer code. The executable computer code may include program instructions executable by a processor (e.g., one or more processors 118) to implement one or more embodiments of described herein. The memory 120 may store an operating system 128 that includes a plurality of computer-executable instructions that may be implemented by the processor 118 to perform a variety of tasks to operate the interface(s) 122 and any other hardware installed on the user device 102. The memory 120 may provide for storage of a camera module 130, a circular buffer 132, and images (indicated by image storage 134).

The camera module 130 may provide a camera user interface for viewing and capturing images via the user device 102. The camera module 130 may receive or provide the capabilities of the camera 126 and determine image parameters associated with an image. In some embodiments, image parameters may be stored with a captured image as image metadata. Additionally, the camera module 130 may store and retrieve images from the circular buffer 132 in accordance with the techniques described herein. Additionally the camera module 130 may provide a user interface for selection of images and may store user-selected images in the memory 120.

The image storage 134 of the memory 120 may store images selected by a user for editing and viewing. In some embodiments, the image storage 134 may include multiple locations for storing different images. In some embodiments, images stored in the memory 120 may be transmitted to the image server 114 for storage in an image storage service, such as a cloud service. Such images may be synced to other user devices of the user.

The circular buffer 132 may store a sequence of images continuously captured by the user device 102 at a frame rate. In such embodiments, the camera 126 of the user device 102 may continuously capture a sequence of images without interaction from a user, and the images captured by the user device may be stored in the circular buffer 132. Images may be retrieved from the circular buffer 132, such as by moving or copying the images from the circular buffer 132 into another memory location. Images may be transferred from the circular buffer 132, such as by moving or copying the images to another location such as image storage 134 or an image storage device of image server 114. In some embodiments, a sequence of images may be stored in the circular buffer 132 after the user device 102 enters a camera ready mode. For example, in some embodiments the camera ready mode may be entered by executing, on the user device 102, a camera application or an application that has camera functionality. Accordingly, FIG. 1 depicts a portion 140 of the circular buffer 132 illustrating captured images 142 stored in the buffer 132. For example, the circular buffer portion 140 may store an $image_n$ that may be captured at a point in time and stored, an $image_{n-1}$ captured one frame before $image_n$, an $image_{n+1}$ captured one frame after $image_n$ and so on. The frame rate of the camera 126 of the user device 102 may be affected by the light source 110. For example, the frame rate of captured images may be higher in relatively bright light and relatively lower in low light. In some embodiments, the frame rate may be 7 frames per second (fps) or less, 10 fps, or less, 15 fps or less, 20 fps, or less, 25 fps or less, 30 fps or less, 35 fps or less, or any other suitable frame rate achievable by the camera of the user device. In some embodiments, the user device 102 may include an ambient light sensor or use image data generated by the camera module 130 (e.g., as included in images stored in the circular buffer 132) to determine the impact of light source 110 (e.g., to determine a lighting condition). In such embodiments, the frame rate of captured images may be associated with a determined lighting condition relative to a pre-determined lighting threshold.

Figure 2:
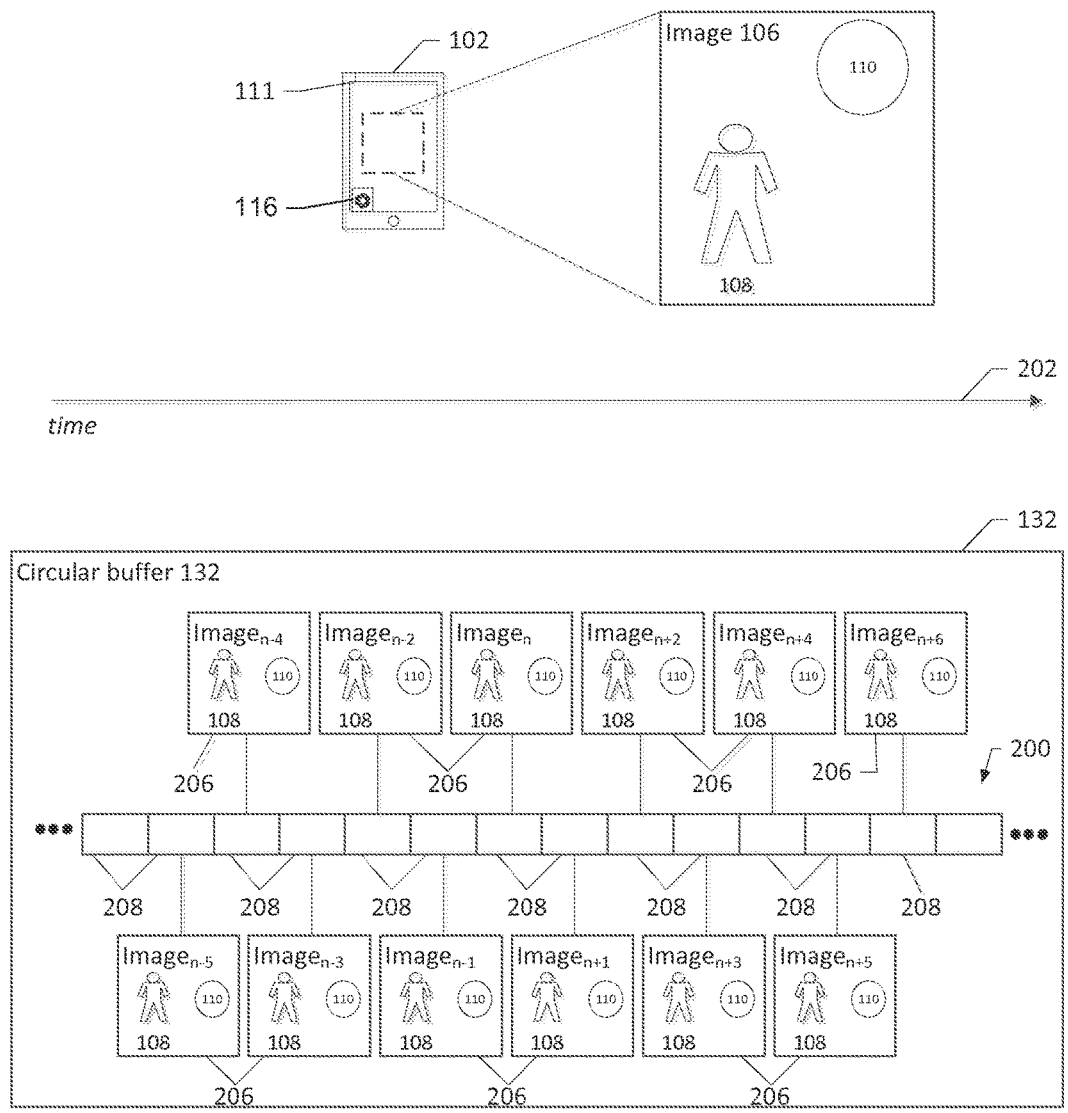
FIG. 2 is a schematic diagram of a user device and a portion of a circular buffer in accordance with an embodiment of the disclosure.

FIG. 2 is a schematic diagram depicting further details of the user device 102 and another portion 200 of the circular buffer 132 in accordance with an embodiment of the disclosure. As shown by arrow 202, as time elapses the user device may continuously capture and store images in the circular buffer portion 202. The portion 202 illustrates various images 206 captured in corresponding locations 208 of circular buffer portion 202 at a frame rate of a camera of the user device 102. For example, an $image_n$ may be captured at a point in time (e.g., at a shutter button selection) and stored, followed by an $image_{n+1}$ captured one frame later, an $image_{n+2}$ captured two frames later, an $image_{n+3}$ captured three frames later and so on. In some embodiments, the point in time at a shutter button selection may refer to the timestamp closest to when shutter button was determined to be selected. For example, if images are being captured at 30 fps, and shutter button is selected between frames being captured, the one closest in time is considered to be the t=0 image. In other embodiments, the t=0 image could be the first image after the shutter button is selected or the image immediately preceding the selection of the shutter button selection. The images captured before a shutter button selection may be referred to as "pre-shutter" images). Similarly, images prior to the capture of $image_n$ may be captured and stored in the circular buffer portion 200, such as $image_{n-1}$, $image_{n-2}$, $image_{n-3}$, and so on. The images captured after a shutter button selection may be referred to as "post-shutter" images. As will be appreciated, in some embodiments, the images 206 may include image metadata describing an image. For example, image metadata may include a resolution, a date and time of image capture, a flash indication (whether the flash of the camera was activated when the image was captured), a frame rate of the camera when the image was captured, and the like.

As also mentioned above, the frame rate of the capture of images 206 may be affected by the lighting conditions present when the images 206 are captured. For example, for relatively bright lighting conditions, the images being captured and stored in the circular buffer portion 200 may be captured at about 30 fps. In such an example, $image_{n+1}$ may be captured ⅟30th of a second after $image_n$, $image_{n+2}$ may be captured ⅟30 the of a second after $image_{n+1}$, and so on. In another example, for relatively low lighting conditions, the images being captured and stored in the circular buffer portion 200 may be captured at a lower frame rate. For example, at a frame rate of 7 fps, $image_{n+1}$ may be captured ⅟7th of a second after $image_n$, $image_{n+2}$ may be captured ⅟7th of a second after $image_{n+1}$, and so on.

Figure 3:
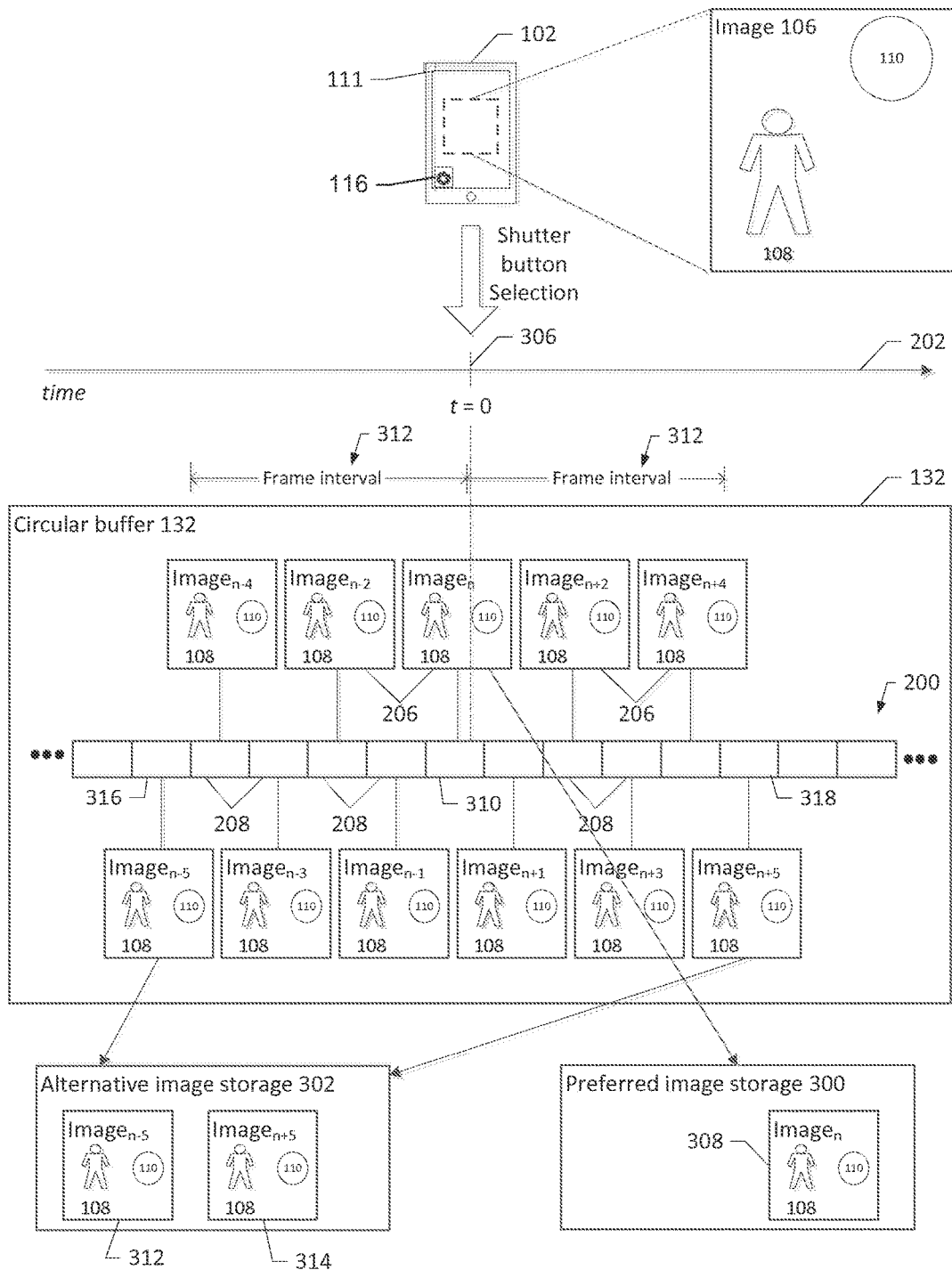
FIG. 3 is a schematic diagram depicting retrieval of images from a portion of the circular buffer in accordance with an embodiment of the disclosure.

As explained below, embodiments of the present disclosure include retrieval of multiple captured images from the circular buffer using a frame interval. The retrieved images may be presented to a user, and the user can select a preferred image (also referred to as a "preferred image" or "best shot") from the retrieved images. FIG. 3 depicts retrieval of captured images from the circular buffer portion 200 using a frame interval based on the frame rate of image capture. As mentioned above and illustrated in FIG. 2, images 206 are continually captured at a frame rate and stored in corresponding locations 208 of the circular buffer portion 202. FIG. 3 also depicts image storage locations 300 and 302 of a memory of the user device 102 that may store images retrieved from the circular buffer portion 200.

At t=0 (indicated by 306) a user may take a photograph of the image 106 by selecting the shutter button 116 of the user device 102, as described above. As described below, a t=0 image ("shutter" image) and alternative images captured before (a "pre-shutter" image) and after (a "post-shutter" image) the t=0 image (a "shutter" image) may be retrieved from the circular buffer 132. In some embodiments, the pre-shutter image and post-shutter image may be retrieved based on either a timestamp associated with the t=0 image or the actual time the shutter button was selected. In some embodiments, alternative images captured before and after the t=0 image may be retrieved from the circular buffer portion 200 using a frame interval based on the frame rate of image capture. The frame interval may define the number of frames to "skip" in the circular buffer when retrieving the alternative images. In some embodiments, the frame rate of image capture may be obtained from the camera (e.g., from metadata provided by an image sensor). In some embodiments, the frame rate may be an average frame rate, an instantaneous frame rate, or another frame rate provided by the camera. In some embodiments, the obtained frame rate is a frame rate immediately prior to the selection of the shutter button. In some embodiments, the frame interval may be calculated to provide a specific time interval between the t=0 image and the alternative images. For example, in some embodiments the frame interval may be calculated to provide a time interval of about 300 ms between the t=0 image and the alternative image before the t=0 image and between the t=0 image and the alternative image after the t=0 image.

As shown in FIG. 3, alternative image 312 (a "pre-shutter" image) captured before the preferred image 308 may be retrieved from the circular buffer based on a frame rate interval 312. In the embodiment depicted in FIG. 3, the illustrated frame rate interval is five frames. Thus, as shown in FIG. 3, the first alternative image 312 ($image_{n-5}$) is retrieved from a location 316 in the circular buffer portion 200 five frames before the capture of the t=0 image 308, such that four frames (corresponding to $image_{n-1}$, $image_{n-2}$, $image_{n-3}$, and $image_{n-4}$) are skipped. The first alternative image 312 may be retrieved from the circular buffer portion 200 and stored in the alternative image storage 302.

As also shown in FIG. 3, the image 308 in the circular buffer portion 200 that corresponds to the time of t=0 may be retrieved and stored as a default preferred image in preferred image storage 300. For example, as shown in FIG. 3, $image_n$ in location 310 of the circular buffer portion 200 may be the image that temporally corresponds to the time t=0. The t=0 image 308 (a "shutter" image) is retrieved from the circular buffer portion 200 and stored in the preferred image storage 300. In some embodiments, the t=0 image 308 may be identified by a pointer for the preferred image that points to a unique identifier for the t=0 image. A second alternative image 314 (a "post-shutter" image) captured after the t=0 image 308 may also be retrieved from the circular buffer portion 200. As shown in FIG. 3, the second alternative image 314 ($image_{n+5}$) may be retrieved from a location 318 in the circular buffer portion 200 that corresponds to a location 318 five frames after the capture of the t=0 image 308 such that four frames (corresponding to $image_{n+1}$, $image_{n+2}$, $image_{n+3}$, and $image_{n+4}$) are skipped. The second alternative image 314 may be retrieved from the circular buffer and also stored in the alternative image storage 302.

In some embodiments, the retrieval and subsequent processing of the t=0 image 308 may be prioritized over retrieval and subsequent processing of the alternative image 314. For example, the t=0 image 308 may be retrieved and a thumbnail of the t=0 image 308 may be generated and provided to a user in a user interface of the user device after retrieval and processing of the first alternative image 312 but before the retrieval and subsequent processing of the second alternative image 314.

In some embodiments, the alternative image storage location 302 may be a different location than the preferred image storage 300 described above. For example, in such embodiments the alternative image storage 302 may be a "hidden" location inaccessible by the user, by certain applications executing on the user device, or both. In such embodiments, the retrieval and storage of the alternative images may be hidden from the user. In some embodiments, the alternative images 312 and 314 may remain stored in the alternative image location until deleted by a user.

In some embodiments, each image retrieved from the circular buffer 132 may be identified using a unique identifier associated with each image. Accordingly, the t=0 image 308 and the alternative images 312 and 314 may each be associated with a unique identifier such that references to each image may be performed using the identifier. In such embodiments, a pointer to the preferred image may identify a unique identifier. For example, if the t=0 image is initially retrieved as the preferred image and stored in the preferred image storage 300, a pointer to the preferred image may identify the unique identifier associated with the t=0 image 308.

Figure 4:
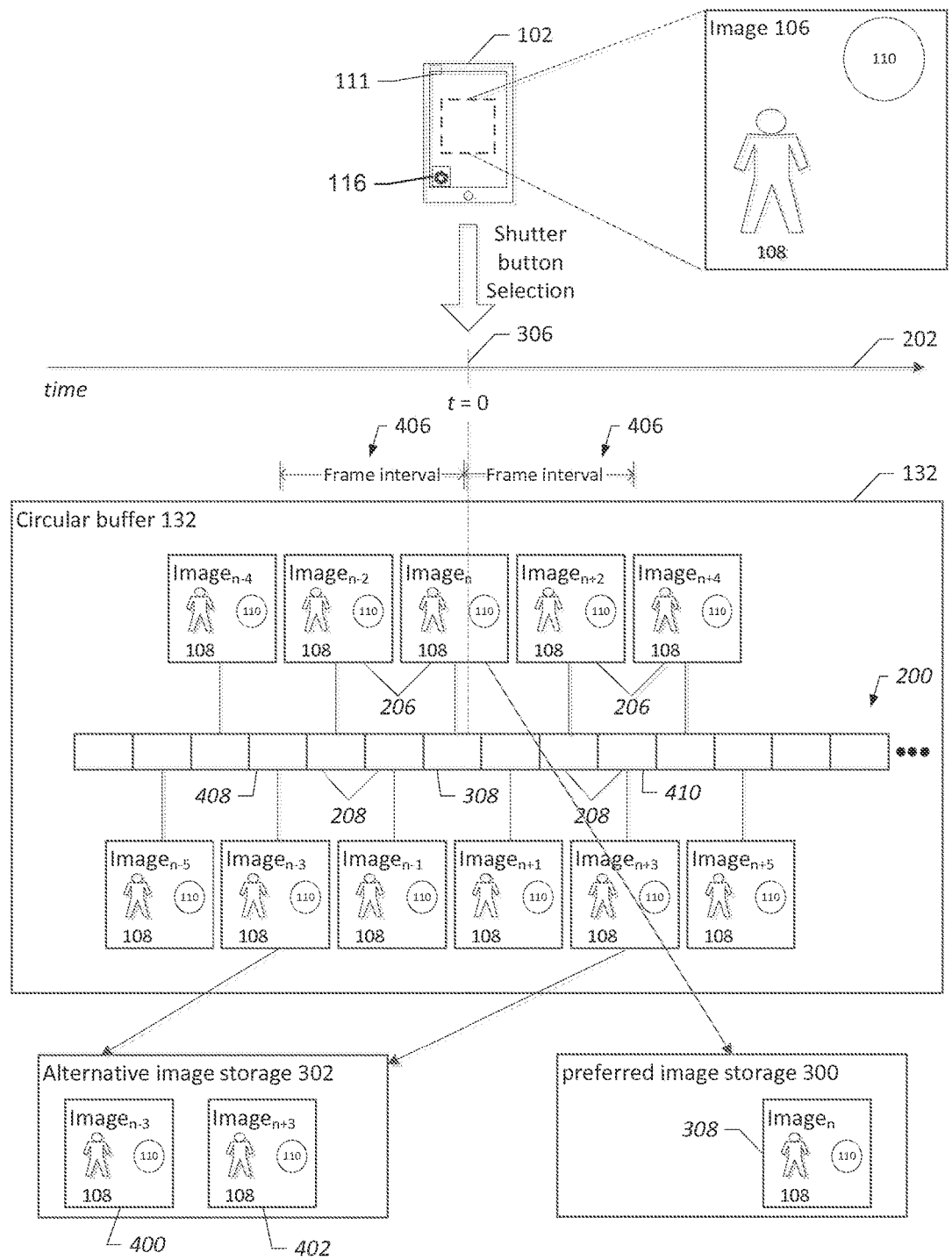
FIG. 4 is a schematic diagram depicting retrieval of images from a portion of the circular buffer in accordance with an embodiment of the disclosure.

FIG. 4 depicts retrieval of alternative images from the circular buffer using another frame rate interval based on the frame rate of image capture. As shown in FIG. 4, after retrieval of the t=0 image 308, alternative images 400 (a "pre-shutter" image) and 402 (a "post-shutter" image) respectively captured before and after the preferred image 308 may be retrieved from the circular buffer based on a frame rate interval 406.

In contrast to the embodiment illustrated in FIG. 3 and described above, the illustrated frame rate interval depicted in FIG. 4 is three frames. As mentioned above, in some embodiments, the frame interval may be calculated to provide a specific time interval between the t=0 image and the alternative images. For example, in the embodiment depicted in FIG. 4, a different frame rate of image capture may result in a shorter frame interval to provide for a specific time interval (e.g., in some embodiments the same time interval specified for the embodiment depicted in FIG. 3). In this manner, a time interval between the t=0 frame and the alternative frames may be maintained relatively constant with regard to changes in frame rate of a camera due to changing lighting conditions.

Thus, as shown in FIG. 4, the first alternative image 400 is retrieved from a location 408 in the circular buffer portion that is three frames before the capture of the t=0 image 308, such that two frames (corresponding to $image_{n-1}$ and $image_{n-2}$) are skipped. As described above, the first alternative image 400 may be retrieved from the circular buffer portion 200 and stored in the alternative image storage 302 of the memory of the user device. Similarly, the second alternative image 402 may be retrieved from a circular buffer location 410 that is three frames after the capture of the t=0 image 308, such that two frames (corresponding to $image_{n+1}$ and $image_{n+2}$ are skipped. The second alternative image 402 may also be stored in the alternative image storage 302.

In some embodiments, the frame interval described above and illustrated in FIGS. 3 and 4 may be symmetrical on either side of the t=0 image. In other embodiments, the frame interval described above may be asymmetrical such that the frame interval before the t=0 image is different from the frame interval after the t=0 image.

Figure 5:
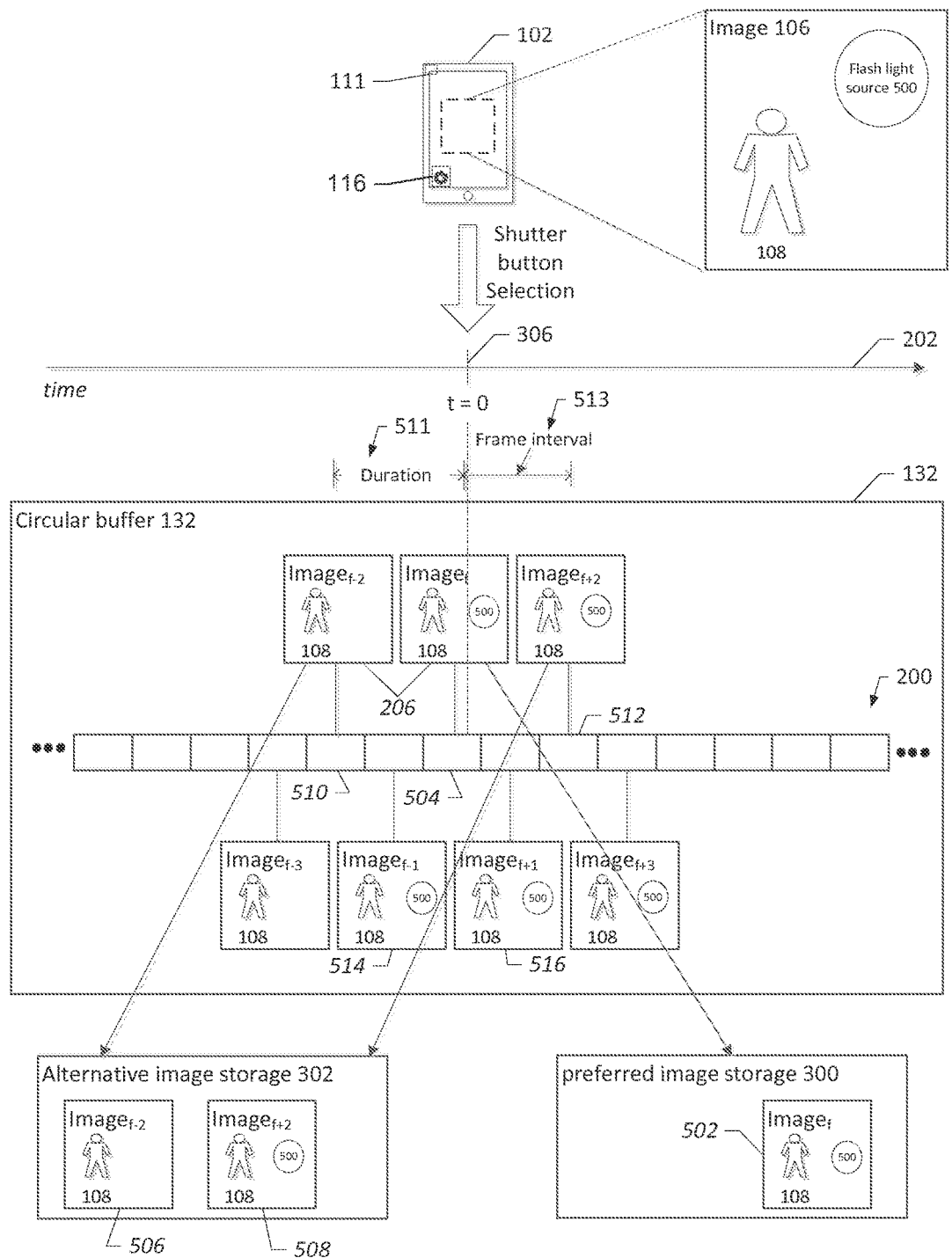
FIG. 5 is a schematic diagram depicting retrieval of images from a portion of the circular buffer in accordance with an embodiment of the disclosure.

In some embodiments, an alternative image may be retrieved based on the absence of a flash when the image was captured. For example, if the t=0 image was captured with a flash (i.e., a flash of the user device was activated and illuminating the image), an image captured before the t=0 image without a flash may be retrieved. FIG. 5 depicts retrieval of alternative images from the circular buffer in accordance with another embodiment of the disclosure. As illustrated in FIG. 5, the image 106 may be captured using a flash light source 500. As described above, when the shutter button is selected an image 502 ($image_f$) captured at time t=0 may be retrieved from a location 504 of the circular buffer and stored in a first image storage portion of the memory of the user device.

As also depicted in FIG. 5, alternative images captured before and after the t=0 image may be retrieved from the circular buffer. As shown in FIG. 5, the first alternative image 506 ($image_{f-2}$) and the second alternative image 508 ($image_{f+2}$) captured before and after the t=0 image 502 may also be retrieved from the circular buffer portion 200 from respective buffer locations 510 and 512. In the embodiment depicted in FIG. 5, the alternative image 506 (a "pre-shutter" image) may be retrieved based on a duration 511 of time before the t=0 image 502 to ensure that the alternative image 506 was not captured with a flash, i.e., the first alternative image 506 was captured before the flash activated in response to the shutter button selection. For example, the image 514 ($image_{f-1}$) that was captured using a flash (i.e., the flash was illuminated for all captured images 502 and 514 may be skipped. In some embodiments, the activation of a flash to capture an image may be determined from an indicated provided by or retrieved from a camera of a user device. For example, at or after the shutter button selection an indication of a flash may be obtained from the camera of the user device.

The alternative image 508 (a "post-shutter" image) after the t=0 image 502 may be retrieved based on a frame interval 513 specifying a number of frames before the t=0 image 502. The frame interval 513 may be based on the image capture frame rate and may be determined as described above. For example, as shown in FIG. 5, the second alternative image 508 is retrieved from a location 512 in the circular buffer portion that is two frames before the capture of the t=0 image 502, such that one frame (corresponding to $image_{f+1}$) is skipped. As described above, the alternative images 506 and 508 are stored in an alternative image storage location 302 of the memory of the user device 102.

Moreover, although FIGS. 3, 4, and 5 are described with reference to one alternative image before the t=0 image and one alternative image after the t=0 image, in other embodiments more than two images may be selected as alternative images. For example, in some embodiments, two images may be retrieved before the t=0 image, and two images may be retrieved after the t=0 images. In such embodiments, multiple frame intervals may be used and different numbers of frames may be skipped to determine the buffer locations for the multiple alternative images.

Figure 6A:
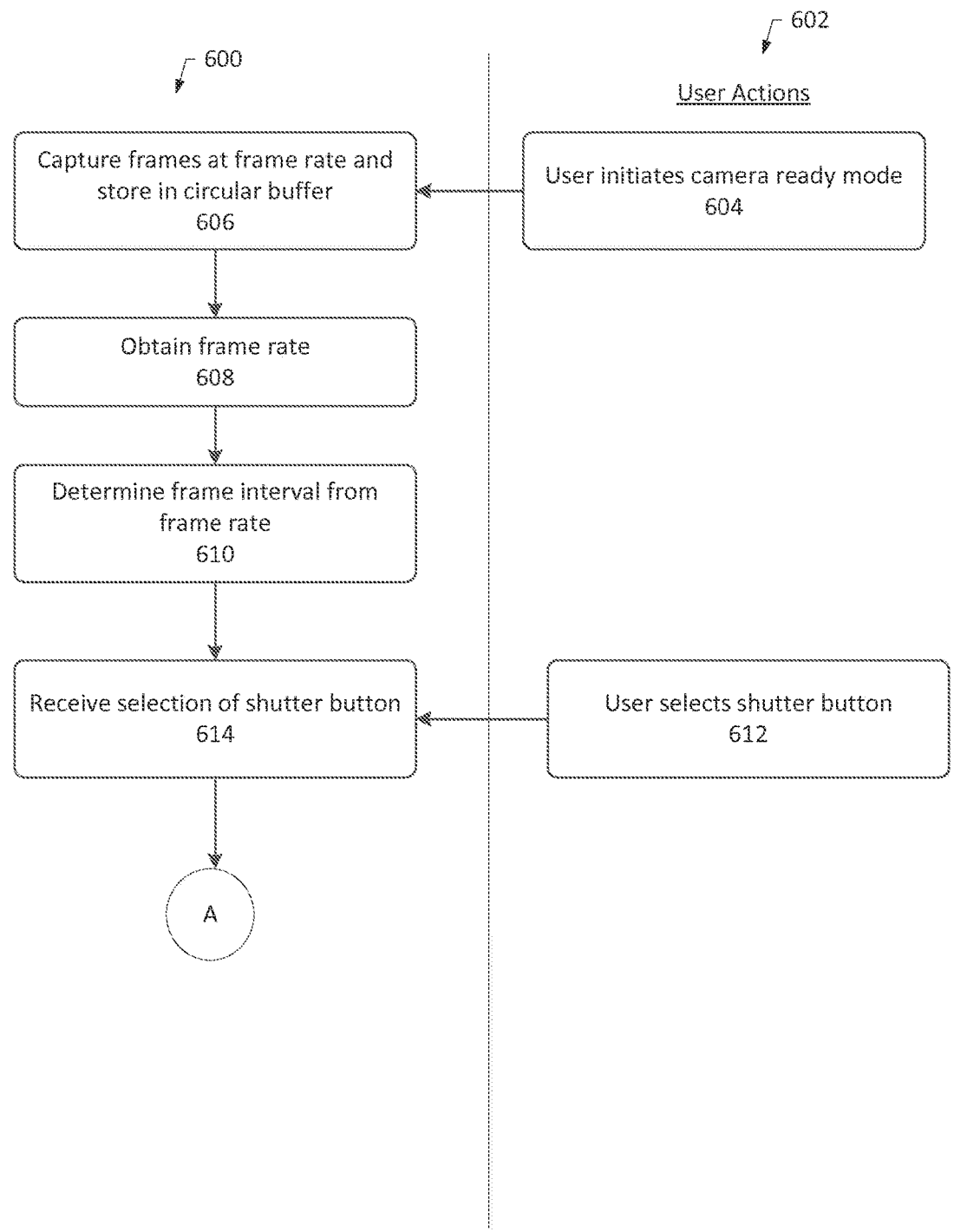
FIGS. 6A, 6B, and 6C are block diagrams of a process for determining a preferred photograph in accordance with an embodiment of the disclosure.
Figure 6B:
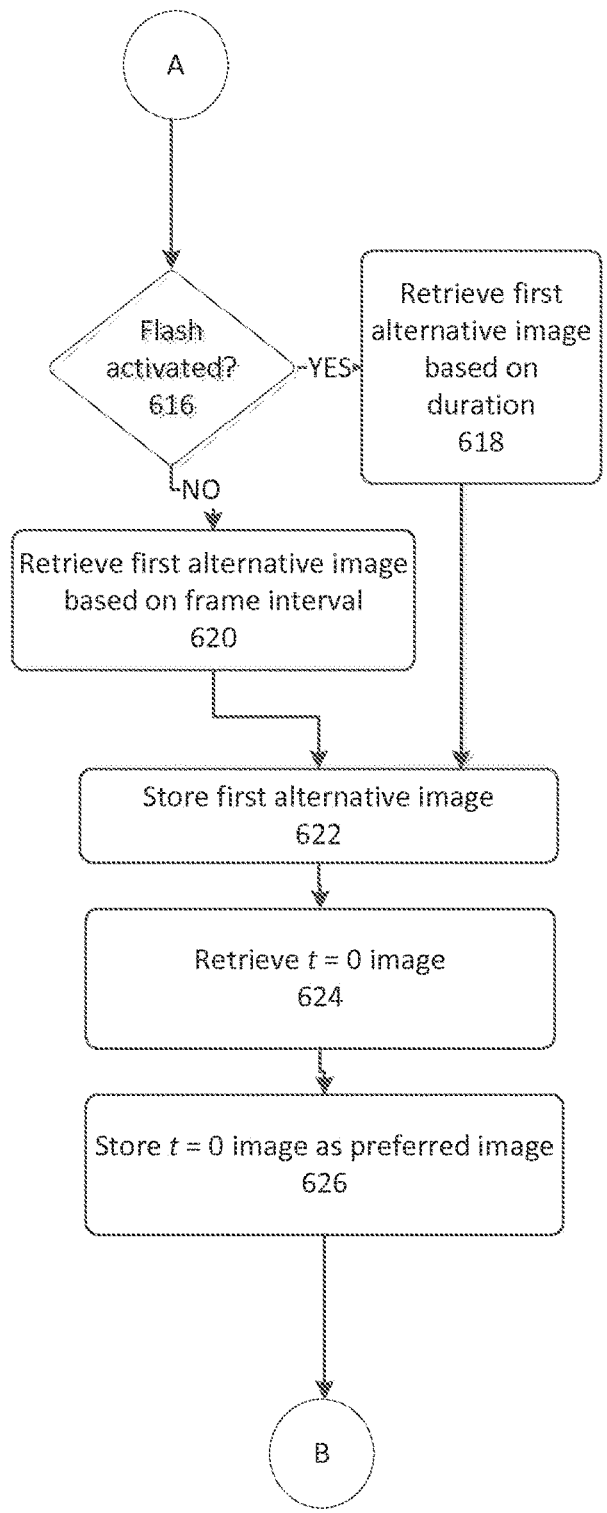
Figure 6C:
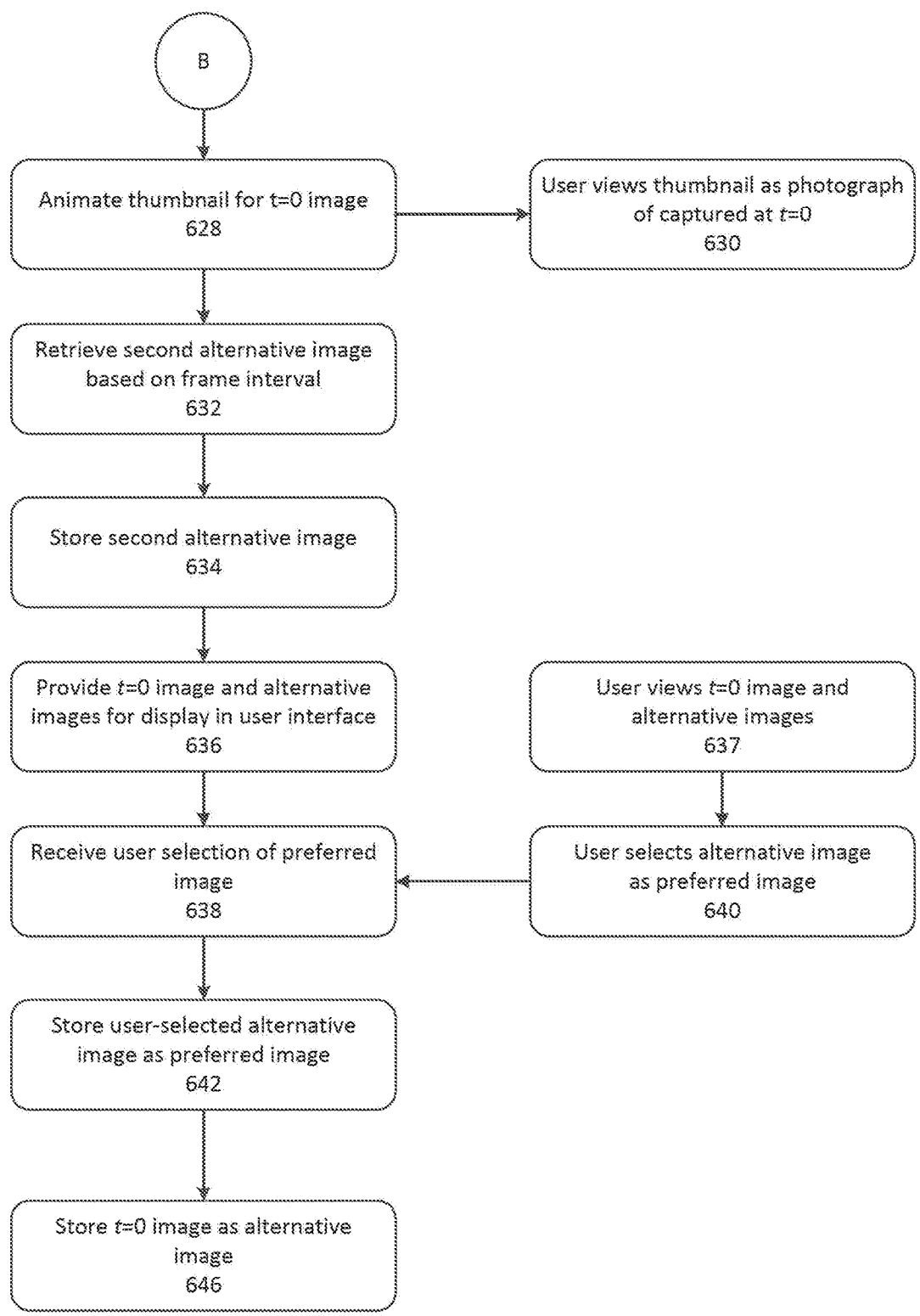

FIGS. 6A, 6B, and 6C depict a process 600 for retrieving and presenting multiple captured images in accordance with an embodiment of the present disclosure. FIGS. 6A and 6B also depict user interactions 602 with a user device. The process 600 may be implemented, for example, on a processor of a user device. The processor of a user device may perform the operations described below or, in some embodiments, may provide instructions to perform one or more of the operations. Initially, a user may initiate a camera ready mode of the user device (block 604), such as by executing of a camera application on the user device or an application on the user device that has camera functionality. As described above, images viewed by the camera are continually captured at a frame rate and stored in a circular buffer of a memory of the user device (block 606).

As shown in FIG. 6A, the frame rate of image capture in the circular buffer is obtained (block 608). In some embodiments, a delta between the obtained frame rate and a previous frame rate may be determined and compared to a threshold. In such embodiments, if the frame rate delta is greater than a threshold, a frame interval may be determined as described below in block 610. If the frame rate delta is less than the threshold, a previous frame interval may be used and a frame interval may not be determined using the obtained frame rate.

As shown in FIG. 6A, based on the frame rate, a frame interval may be determined for retrieval of alternative images from the circular buffer (block 610). For example in some embodiments the frame interval may be selected such that a time interval between the alternative images and the preferred image is about 300 ms. Next, if a user desires to take a photograph the selection of the shutter button may be received (block 614). The process 600 is further illustrated in FIG. 6B, as shown by connection block A.

The activation of a flash when the shutter button was selected may also be determined (decision block 616), such as from an indicator provided by the camera. If a flash was activated, the first alternative image before the t=0 image may be retrieved from the circular buffer based on a duration before the t=0 image. (block 618). If a flash was not activated when the shutter button was selected, an image before the capture of the t=0 image may be retrieved based on the determined frame interval as the first alternative image (block 620). The retrieved first alternative image may be stored in an alternative image location of a memory of the user device (block 622).

As described above, the image corresponding to the time of shutter button selection (t=0) may be retrieved from the circular buffer of captured images (block 624). The t=0 image may be stored as the preferred image (also referred to as "best shot") in a preferred image storage (block 626). As shown by connection block B depicted in FIG. 6B, the process 600 and user actions 602 are further illustrated in FIG. 6C.

As shown in FIG. 6C, a thumbnail corresponding to the t=0 image may be generated (block 628) and provided for display in a user interface (block 630). The user may view the thumbnail in the user interface as an indication of the photograph associated with the shutter button selection (block 632).

As described above, an image captured after the t=0 image may be retrieved based on the determined frame interval as the second alternative image (block 632). The retrieved second alternative image may be also stored in an alternative image location of a memory of the user device (block 634).

Next, the t=0 image and the alternative images may be provided for display to the user, such as in an image selection user interface (block 636), to enable a user to select a preferred image (also referred to as a "best shot" image) for the photograph. For example, in some embodiments, the t=0 image and the alternative images may be displayed to the user in a user interface, and a user may view all three images (block 637). In some embodiments, the t=0 image may be selected as the default preferred image. After viewing the alternative images (block 637), the user may decide to keep the default preferred image, the t=0 image, as the preferred image for the photograph.

As shown in FIG. 6C, in some instances, the user may select an alternative image as the preferred image (block 640). The selection of the alternative image may be received (block 638), and the alternative image may be stored as the preferred image (block 642). Additionally, the deselected t=0 image may then be stored as an alternative image (block 646) For example, in some embodiments, the user-selected alternative image may be moved to the preferred image storage location and the unselected t=0 image may be moved to the alternative image storage location. In some embodiments, the alternative images may remain stored in the alternative image storage location until explicitly deleted by the user (e.g., via the user interface in the manner described above). In some embodiments, the t=0 image and the alternative images may be named to reflect the selected preferred image. The first alternative image (captured before the t=0 image) may be named using a "0.1" suffix and the second alternative image may be named using a "0.3" suffix. As the default preferred image, the t=0 image may be named without a suffix. When an alternative image is selected as the preferred image, the t=0 image may be renamed using a "0.2" suffix and the selected alternative image may be renamed without a suffix. In some embodiments, a pointer for the photograph may be modified to point to a unique identifier associated with the user-selected alternative image.

In some embodiments, the user-selected preferred image may be transmitted to a cloud storage service, (e.g., device networked storage device). In some embodiments, other user devices of the user, such as smartphones, tablet computers, and so on, may synchronize with the cloud storage service and may receive the user-selected preferred image for storing in an image collection. Thus, other user devices may also indicate that the user-selected preferred image is the photograph captured at t=0. In some embodiments, only one of the t=0 image, first alternative image, and second alternative image may be transmitted to and stored by a networked storage device, such as based on one of images selected by the user as a preferred image. In other embodiments, the t=0 image and the alternative images may all be transmitted and stored on a network storage device. In some embodiments, the preferred image and the alternative images may be compressed into a single image (e.g., a JPEG file) for storing by the cloud storage service. In such embodiments, a user device may decompress the JPEG file to separate the preferred image and the alternative images for viewing and editing. In some embodiments, user devices without the capability decompress the JPEG file may process the JPEG file as a single preferred image without reference to the other compressed data representing the alternative images.

Figure 7A:
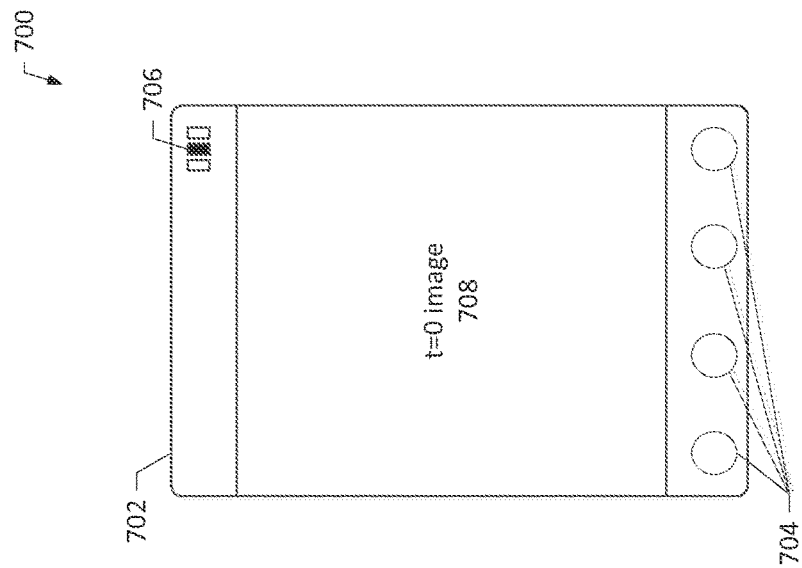
Figure 7E:
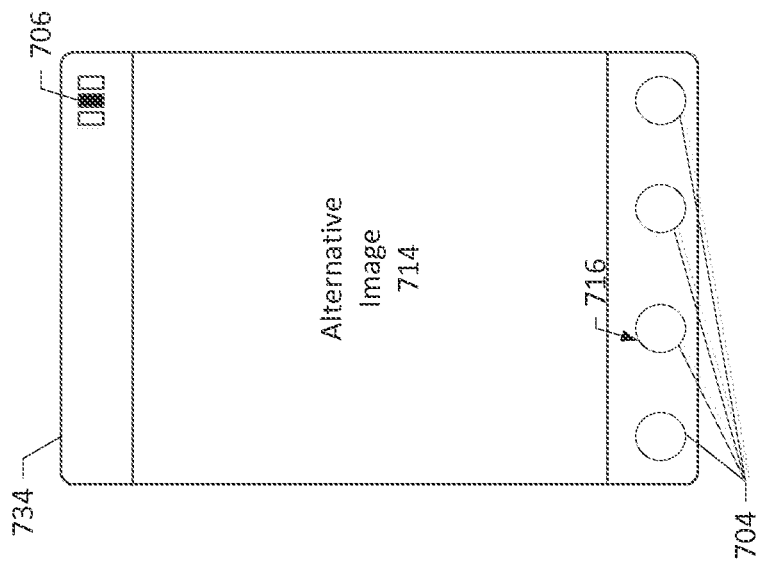

FIGS. 7A-7E depict screens of a user interface 700 of a user device illustrating selection of a preferred image from a t=0 image and alternative images in accordance with the techniques described herein. FIG. 7 depicts a screen 702 of a user interface illustrating the initial display of a t=0 image retrieved in response to a user selection of a shutter button of a user device. The user interface 700 may include various user-selectable elements, such as user-selectable buttons 704, such for switching to an image capture mode, sharing an image, editing an image. The user interface 700 may also include a user-selectable button 706 for entering an image selection mode that enables a user to select a preferred photograph from among a t=0 image and alternative images. As shown in FIG. 7A, initially a thumbnail image 708 of the t=0 image retrieved in response to the selection of the shutter button is displayed in the user interface 700. As described above, in some embodiments the t=0 may be retrieved and processed before retrieval and processing of the alternative images described herein to minimize delay in presenting the thumbnail image 708 to a user.

FIG. 7B depicts another screen 710 of the user interface 700 illustrating an image selection mode in accordance with an embodiment of the present disclosure. As shown in FIG. 7B, the thumbnail 708 of the t=0 image may initially be displayed as the default preferred image. A portion of the thumbnails 712 and 714 of alternative images may also be displayed on either side of the t=0 image thumbnail 708. For example, the alternative image thumbnail 712 displayed to the left of the t=0 image thumbnail 708 may correspond to the alternative image captured before the capture of the t=0 image, as determined according to the techniques described above. Similarly, the alternative image thumbnail 714 displayed to the right of the t=0 image thumbnail 708 may correspond to the alternative image captured after the capture of the t=0 image, as determined according to the techniques described above. The screen 710 also depicts instructions 716 that may instruct a user how to move, select, or otherwise interact with the displayed images.

A selected image control, such as radio button 718, may be overlaid on the images to indicate the image selected as the user's preferred image. Accordingly, for the currently selected t=0 image 708, the radio button 718 may be selected to show that the t=0 image is selected as the default preferred image. The user interface may also include a confirmation button 720 that confirms a selection of an image and, in some embodiments, exits the image selection mode. In some embodiments, a user may switch between the t=0 image 708 and the alternative images 712 and 714 by performing a swipe gesture on the screen 710 in the directions indicated by arrows 722 and 723. For example, a user may switch to the alternative image 712 by swiping to the left and switch to the alternative image 714 by swiping to the right. In other embodiments, user interface controls or other gestures may be used to switch between the images 708, 712, and 714. Additionally, in some embodiments a user may delete an image by performing a swipe gesture in the direction indicated by arrow 724, (e.g., by "pushing" the image up until it disappears from the screen 710). Similarly, in some embodiments a user may save an image as a separate image by performing a swipe gesture in the direction indicated by arrow 726 (e.g., by "pulling" the image down until it disappears from the screen 710). In some embodiments, the unselected images presented in the user interface 700 may remain stored on the user device until deleted via the user interface.

FIG. 7C depicts another screen 728 of the user interface 700 illustrating a switch to the alternative image 714. For example, the user may swipe in the direction indicated by arrow 722 to switch to the alternative image 714. As shown in FIG. 7C, a portion of the t=0 image 708 is displayed on the left side of the screen 728 and the alternative image 714 is displayed in the center of the screen 728. In some embodiments, the switch between images may be visualized via an animation responsive to a swipe gesture or other gesture or user interface control that enables switching between images. As also shown in FIG. 7C, a radio button 730 may be overlaid on the alternative image 714. The radio button 730 may be unselected if, as shown in FIG. 7C, another image (the t=0 image 708) is currently selected as the preferred image.

Figure 7D:
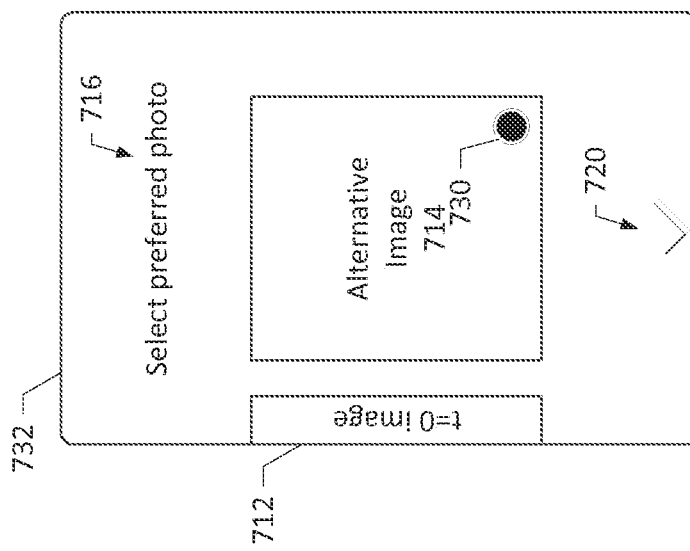

FIG. 7D depicts another screen 732 illustrating selection of the alternative image 714 as the preferred image. As shown in 7D, the radio button 730 may be selected by a user to select the alternative image 714 as the preferred image. A user may confirm a selection of a preferred photograph by selecting the confirmation button 720. After confirmation, the user may be presented with the screen 734 depicted in FIG. 7E. After the alternative image 714 is selected as the preferred image, the screen 734 may be displayed to indicate that the alternative image 714 is the preferred image for the photograph taken via the shutter button selection. As mentioned above, in some embodiments after selection of a different preferred image, the user-selected preferred image may be transmitted, via a network, to one or more servers of a cloud storage service. In such embodiments, a user may access the t=0 photograph from other user devices and view the user-selected preferred image as the t=0 photograph.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatus, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A method, comprising:
    storing, in a first memory of a user device, a first sequence of images, the first sequence of images associated with a shutter selection and including a first image, a second image and a third image;
    determining the first image from the first sequence of images, wherein the first image was captured before the shutter selection;
    determining the second image of the first sequence of images, wherein the image was captured after the shutter selection;
    displaying a portion of the first sequence of images, the portion of the first sequence of images including the third image and a first indication that a fourth image is a preferred image;
    displaying a selectable element in association with the third image;
    receiving a second indication of a selection of the selectable element; and
    displaying an indicator that the third image replaced the fourth image as the preferred image.

2. The method of claim 1, further comprising:
generating a file name for the third image, wherein the file name indicates the third image is the preferred image.

3. The method of claim 1, further comprising:
determining a first lighting condition of an ambient environment; and
determining a first frame rate at which to capture the first sequence of images, wherein the first frame rate is associated with the first lighting condition.

4. The method of claim 3, further comprising:
storing, in the first memory at the user device, a second sequence of images after the first sequence of images;
determining a fifth image from the second sequence of images, wherein the fifth image is captured during activation of a light source of the user device;
determining a sixth image from the second sequence of images, wherein the sixth image is captured before the fifth image and before activation of the light source; and
displaying the fifth image; and
displaying the sixth image.

5. The method of claim 4, further comprising:
determining a second lighting condition of the ambient environment; and
determining a second frame rate at which to capture the second sequence of images, wherein the second frame rate is associated with the second lighting condition.

6. The method of claim 5, further comprising:
determining to transfer the sixth image from the memory to a network storage device, wherein the determination to transfer the sixth image from the memory comprises determining the sixth image based on the second frame rate.

7. The method of claim 5, further comprising:
determining a number of frames based on the second frame rate.

8. The method of claim 7, wherein determining the number of frames comprises calculating the number of frames to capture between the fifth image and the sixth image.

9. The method of claim 1, wherein the fourth image is displayed as a first thumbnail in the middle of a display.

10. The method of claim 9, wherein the first image is displayed as a second thumbnail to the left of the fourth thumbnail.

11. The method of claim 9, wherein the second image is displayed as a third thumbnail to the right of the fourth thumbnail.

12. A user device, comprising:
memory storing computer-executable instructions; and
at least one processor configured to access the memory and execute the computer-executable instructions to:
store, in the memory, a first sequence of images, the first sequence of images associated with a shutter selection and including a first image, a second image and a third image;
determine the first image from the first sequence of images, wherein the first image was before the shutter selection;
determine the second image of the first sequence of images, wherein the second image was captured after the shutter selection;
display a portion of the first sequence of images, the portion of the first sequence of images including the third image and an indicator that a fourth image is a preferred image;
display a selectable element in association with the fourth image;
receive an indication of a selection of the selectable element;
remove the indicator from the fourth image; and
display the indicator in association with the third image.

13. The user device of claim 12, wherein the at least one processor is further configured to:
determine a first lighting condition of an ambient environment; and
determine a first frame rate at which to capture the first sequence of images, wherein the first frame rate is associated with the first lighting condition.

14. The user device of claim 13, wherein the at least one processor is further configured to:
store, in the memory, a second sequence of images after the first sequence of images;
determine a fifth image from the second sequence of images, wherein the fifth image is captured during activation of a light source of the user device;
determine a sixth image from the second sequence of images, wherein the sixth image is captured before the fifth image and before activation of the light source; and
display the fifth image; and
display the sixth image.

15. The user device of claim 14, wherein the at least one processor is further configured to:
determine a second lighting condition of the ambient environment; and
determine a second frame rate at which to capture the second sequence of images, wherein the second frame rate is associated with the second lighting condition.

16. The user device of claim 15, wherein the at least one processor is further configured to:
determine to transfer the sixth image from the memory to a network storage device, wherein the determination to transfer the sixth image from the memory comprises determining the sixth image based on the second frame rate.

17. The user device of 15 wherein the at least one processor is further configured to:
determine a number of frames based on the second frame rate.

18. The user device of claim 17, wherein the instructions that cause the at least one processor to determine the number of frames further comprise instructions that configure the at least one processor to:
calculate the number of frames to capture between the fifth image and the sixth image.

19. The user device of claim 12, wherein the user device further comprises a display and the at least one processor is further configured to:
display a first thumbnail, associated with the third image, in the middle of the display.

20. The user device of claim 19, wherein the at least one processor is further configured to:
display as a second thumbnail, associated with the first image, to the left of the first image, on the display.

* * * * *